(12) United States Patent
Price

(10) Patent No.: US 7,488,433 B2
(45) Date of Patent: Feb. 10, 2009

(54) THERMAL STABILIZER COMPOSITIONS FOR HALOGEN-CONTAINING VINYL POLYMERS

(75) Inventor: Lionel R. Price, Cincinnati, OH (US)

(73) Assignee: Rohm and Haas Company, Philadelphia, PA (US)

( * ) Notice: Subject to any disclaimer, the term of this patent is extended or adjusted under 35 U.S.C. 154(b) by 580 days.

(21) Appl. No.: 11/169,484

(22) Filed: Jun. 29, 2005

(65) Prior Publication Data

US 2006/0025503 A1 Feb. 2, 2006

Related U.S. Application Data

(60) Provisional application No. 60/592,857, filed on Jul. 30, 2004.

(51) Int. Cl.
*C09K 15/32* (2006.01)

(52) U.S. Cl. ............... 252/400.52; 524/99; 524/102

(58) Field of Classification Search ........... 252/400.52; 524/99, 102
See application file for complete search history.

(56) References Cited

U.S. PATENT DOCUMENTS

| | | |
|---|---|---|
| 3,001,970 A | 9/1961 | Ebel |
| 4,209,439 A | 6/1980 | Pigerol et al. |
| 4,427,816 A | 1/1984 | Aoki et al. |
| 5,015,777 A | 5/1991 | Chisolm et al. |
| 5,102,933 A | 4/1992 | Bae et al. |
| 5,278,218 A | 1/1994 | Carette et al. |
| 5,814,691 A | 9/1998 | Kuhn et al. |
| 5,925,696 A | 7/1999 | Wehner et al. |
| 6,136,900 A | 10/2000 | Kuhn et al. |
| 6,194,494 B1 | 2/2001 | Wehner et al. |
| 6,537,466 B1 | 3/2003 | Duvall et al. |
| 6,897,254 B2 | 5/2005 | Adams et al. |
| 2004/0204522 A1 | 10/2004 | Austen et al. |

FOREIGN PATENT DOCUMENTS

| | | |
|---|---|---|
| EP | 0070092 | 1/1983 |
| EP | 0362012 | 4/1990 |
| EP | 0 742 259 B1 | 11/1996 |
| EP | 0 890 608 A2 | 1/1999 |
| EP | 0 890 608 A3 | 4/1999 |
| EP | 0 945 485 B1 | 9/1999 |
| EP | 1 201 706 A1 | 2/2002 |
| EP | 1 318 169 B1 | 6/2003 |
| WO | WO/0206392 | 1/2002 |

OTHER PUBLICATIONS

Garrigues C., et al., *Thermal dehydrochorination and stabilization of poly(vinylchloride) in solution. Part XI Snynergism between dialkyltin thioglycolates and organic costabilizers*, Polymer Degradation and Stability 45 (1994) 103-110, Elsevier Science Limited.

Guyot A., et al, *Thermal Dehydrochorination and Stabilisation of Poly(vinylchloride) in Solution. Part VII- Quaternary Stabiliser System with Two Metal Soaps, Dihydropyridine and β- Diketone*, Polymer Degradation and Stability 32 (1991) 321-329, Elsevier Science Limited.

*Primary Examiner*—Peter D Mulcahy
(74) *Attorney, Agent, or Firm*—Karl E. Stauss; Stephen T. Falk

(57) ABSTRACT

Synergistic stabilizer compositions are employed to stabilize halogen-containing vinyl polymers from, for example, degradation and discoloration. The stabilizer compositions comprise a zinc compound, a dihydropyridine or polydihydropyridine, a beta-diketone and a latent mercaptan.

10 Claims, No Drawings

THERMAL STABILIZER COMPOSITIONS FOR HALOGEN-CONTAINING VINYL POLYMERS

CROSS REFERENCE TO RELATED PATENT APPLICATIONS

This is a non-provisional patent application of co-pending U.S. provisional patent application Ser. No. 60/592,857 filed Jul. 30, 2004.

BACKGROUND

This invention relates to stabilizer compositions for halogen-containing vinyl polymers, the stabilized halogen-containing vinyl polymer compositions and articles formed therefrom, and methods for stabilizing halogen-containing vinyl polymers.

Halogen-containing vinyl polymers, for example, poly(vinyl chloride) (PVC), copolymers of vinyl chloride and vinyl acetate, and poly(vinylidene chloride), are commonly used for fabricating a variety of articles such as pipes, window casings, siding, bottles, wall covering and packaging film. There have been many attempts to add stabilizers to halogen-containing vinyl polymers to improve the color hold in the polymer resins, particularly the color hold within the processing window, e.g., during the initial processing and during any subsequent re-processing. Most stabilizer compositions in present use contain metals such as tin, cadmium, and even lead. While these stabilizer compositions can be effective for minimizing discoloration during initial processing, as well as during any subsequent re-processing, there has been increasing interest in developing stabilizer compositions that are free of tin, cadmium, and/or lead for environmental, cost, and other reasons.

Latent or blocked mercaptans have been found to be particularly effective for minimizing discoloration early in processing, as well as for providing long-term color stability, i.e., when the polymer is exposed to ultraviolet light and weathering. An advantage of the latent mercaptans is that release of the free mercaptan during processing can augment the effects of other stabilizers (i.e., such as organic or metallic stabilizers). An example of such combination is disclosed in U.S. Pat. No. 4,973,619, in which a latent mercaptan is combined with a fatty acid salt of cadmium or zinc.

Dihydropyridines may also be used as stabilizers for polyvinyl chloride polymer compositions as described in U.S. Pat. No. 4,209,439. It was shown that dihydropyridines are effective thermal stabilizers at lower concentrations than those used for 2-phenyl indole, a well-known thermal stabilizer. A combination of a dihydropyridines with an amino uracil has been described in U.S. Pat. Nos. 5,925,696 and 6,194,494.

Beta-diketones, another class of thermal stabilizers, may be used alone or in combination with other stabilizers. U.S. Pat. No. 3,001,970 describes the stabilization of vinylidene chloride with an ortho-hydroxy-dibenzoylmethane. U.S. Pat. No. 4,427,816 describes a synergistic combination of a beta-diketone and a hydrotalcite. In U.S. Pat. No. 5,015,777, a stabilizer composition comprising a beta-diketone, mannitol, and a mixture of magnesium and zinc salts of benzoic and fatty aliphatic acids is described.

While these prior art combinations are suitable for their intended purpose, there remains a need in the art for improved stabilizer compositions for halogen-containing vinyl polymers, particularly compositions that are free from cadmium, tin, and/or lead, and that provide improved resistance to discoloration during processing and/or use.

STATEMENT OF THE INVENTION

In a first aspect, there is provided a thermal stabilizer composition comprising a zinc compound, a latent mercaptan, wherein the latent mercaptan is of formula (1):

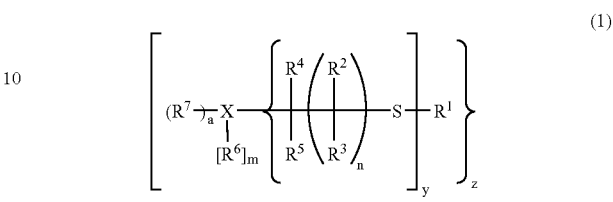

(1)

wherein a=0 or 1, m=0 or 1, n=0 or 1, and y=1-4 with the proviso that when y=1, z=1-4 and when y is greater than 1, z=1; $R^1$ is a monovalent, divalent, trivalent, or tetravalent $C_{1-400}$ alkyl, alkenyl, cycloalkyl, cycloalkenyl, aryl, alkaryl, aralkyl, alkenylaryl, aralkenyl, hydroxyalkyl, dihydroxyalkyl, hydroxy(polyalkoxy)alkyl, alkoxyalkyl, hydroxyalkoxyalkyl, alkoxy(hydroxyalkyl), alkoxy(acyloxyalkyl), alkoxy(polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy(polyalkoxy)alkyl, benzoyloxy(polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy)carbonylalkyl, mercaptoalkyl, mercaptoalkenyl, mercaptoalkoxycarbonylalkyl, mercaptoalkoxycarbonylalkenyl, alkoxycarbonyl(amido)alkyl, alkylcarbonyloxy(polyalkoxy)carbonylalkyl, tetrahydopyranyloxy(polyalkoxy)carbonylalkyl, tetrahydropyranyloxyalkyl, hydroxyaryl, mercaptoaryl or carboxyaryl group; $R^2$, $R^3$, $R^4$, $R^5$, $R^6$, and $R^7$ are each independently a —H, —OH, —SH, acyl, $C_{1-52}$ alkyl, alkenyl, aryl, haloaryl, alkaryl, aralkyl, hydroxyalkyl, mercaptoalkyl, hydroxyaryl, alkoxyaryl, alkoxyhydroxyaryl, or mercaptoaryl group; X is aryl, haloaryl, alkaryl, aralkyl, hydroxyaryl, dihydroxyaryl, cycloalkyl aryl, arylcycloalkyl, or a heteroatom, $R^6$ and $R^7$ may form a heterocyclic moiety in conjunction with X as nitrogen when a is 1 and m is 1, one of $R^1$, $R^3$, and $R^5$ may join with $R^7$ and X to form a heterocyclic moiety with X as a heteroatom selected from the group consisting of oxygen and sulfur when a=1 and m=0; with the proviso that when X is aralkaryl, z is 1 or 2, $R^6$ and $R^7$ are —OH, a=1, and m=1, and with the further proviso that when $R^6$ is —OH or —SH, z=1;

a dihydropyridine, a polydihydropyridine, or a mixture thereof, wherein the dihydropyridine is of formula (2)

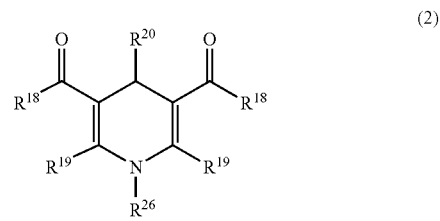

(2)

wherein each $R^{19}$ is independently a $C_1$ to $C_{36}$ alkyl group, each $R^{18}$ is independently hydrogen, —$OR^{21}$, —$NHR^{21}$, or —$NR^{21}R^{22}$ wherein each $R^{21}$ and $R^{22}$ are independently a substituted or unsubstituted $C_1$-$C_{20}$ alkyl or $C_2$-$C_{20}$ alkenyl group, each $R^{20}$ is independently hydrogen, oxygen, halogen, or a substituted or unsubstituted $C_1$ to $C_{36}$ alkyl, alkenyl, aryl, alkaryl, or aralkyl group, and $R^{26}$ is a hydrogen, a substituted or unsubstituted $C_1$-$C_{20}$ alkyl, $C_6$-$C_{36}$ aryl, or $C_6$-$C_{36}$ alkaryl group, and wherein the polydihydropyridine is of formula (3):

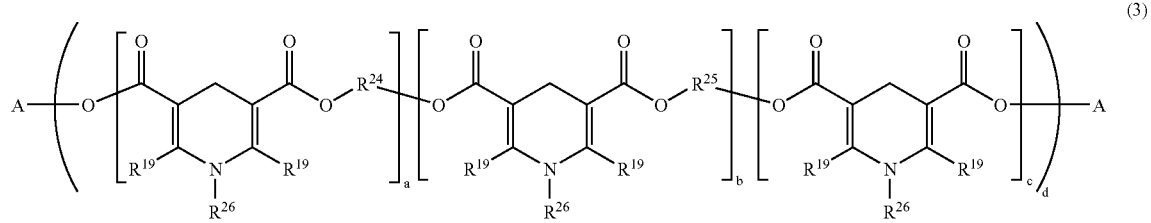

wherein A is a $C_{6-18}$ aryl or $C_{1-22}$ alkyl group that is unsubstituted or substituted with a $C_1$-$C_{18}$ alkoxy, $C_1$-$C_{18}$ alkylthio, hydroxy, acryloyloxy, methacryloyloxy, halogen, phenyl or naphthyl group, $R^{19}$ is independently a $C_1$ to $C_{36}$ alkyl group, a and b are a number from 0 to 20, c is 0 or 1, and d is a number from 1 to 6, with the proviso that d(a+b+c)>1 and (a+b)>0, $R^{24}$ and $R^{25}$ are each independently methylene, phenyl, or an alkylene group of the type $(-C_pH_{2p}-Q-)_tC_pH_{2p}-$, wherein p is a number from 2 to 18, t is a number from 0 to 10, and Q is oxygen or sulfur, and $R^{26}$ is a hydrogen, a substituted or unsubstituted $C_1$-$C_{20}$ alkyl, $C_6$-$C_{36}$ aryl or $C_6$-$C_{36}$ alkaryl group; and a beta-diketone wherein the beta-diketone is of formula (4)

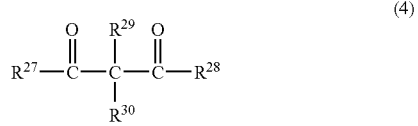

wherein $R^{27}$ is an alkyl group having greater than or equal to 10 carbon atoms, $R^{28}$ is phenyl group or phenyl group substituted with up to 3 lower alkyl groups, and $R^{29}$ and $R^{30}$ are each independently hydrogen, $C_1$-$C_{18}$ alkyl groups, or $C_1$-$C_{18}$ alkyl groups substituted with halogen, hydroxy, alkoxy, ester alkyl, or alkoxy carbonyl.

In a second aspect, there is provided a stabilized polymer composition comprising a halogen-containing vinyl polymer and the above-described stabilizer composition.

In another aspect, there is provided an article comprising the above-described stabilized polymer composition.

In another aspect, there is provided a method of stabilizing a polymer composition, comprising adding the above-described stabilizer composition to a halogen-containing vinyl polymer composition.

DETAILED DESCRIPTION

The terms "a" and "an" herein do not denote a limitation of quantity, but rather denote the presence of at least one of the referenced item. As used herein, a hydrocarbyl group is a group that is inclusive of saturated or unsaturated hydrocarbons, i.e., alkyl, cycloalkyl, alkenyl, cycloalkenyl, aryl, aralkyl, aralkaryl, aracycloalkyl, aralkenyl, alkaryl, cycloalkaryl, and alkenylaryl groups, as well as mixtures of the foregoing groups. The term is specifically contemplated to include mixtures of hydrocarbons derived from natural sources, for example tall oil, and the like. Further, alkyl groups and the alkyl portion of the foregoing groups may be linear or branched unless otherwise indicated. The term oxyalkylenyl means a divalent group of a polyalkylene ether molecule. Also as used herein, an acyloxyalkyl group originates from a carboxylic acid ester of an alcohol, thus has the formula $-ROC(=O)R$ (e.g., the stearic acid ester of mercaptopropanol has a stearoyloxypropyl group); while an alkoxycarbonylalkyl group has the formula $-RC(=O)OR$ (e.g., lauryl 3-mercaptopropionate has a dodecyloxycarbonylethyl group). The abbreviation "phr" refers to parts by weight of a particular component per 100 parts by weight of the halogen-containing vinyl polymer.

As used herein, "alkyl" is intended to include both branched and straight-chain saturated aliphatic hydrocarbon groups, having the specified number of carbon atoms. Thus, the term $C_1$-$C_6$ alkyl as used herein includes alkyl groups having from 1 to 6 carbon atoms. When $C_0$-$C_n$ alkyl is used herein in conjunction with another group, for example, (phenyl)$C_0$-$C_4$ alkyl, the indicated group, in this case phenyl, is either directly bound by a single covalent bond ($C_0$), or attached by an alkyl chain having the specified number of carbon atoms, in this case from 1 to about 4 carbon atoms. Examples of alkyl include, but are not limited to, methyl, ethyl, n-propyl, isopropyl, n-butyl, t-butyl, n-pentyl, and sec-pentyl.

"Alkenyl" as used herein, indicates a hydrocarbon chain of either a straight or branched configuration having one or more carbon-carbon double bond bonds, which may occur at any stable point along the chain. Examples of alkenyl groups include ethenyl and propenyl.

"Alkoxy" represents an alkyl group as defined above with the indicated number of carbon atoms attached through an oxygen bridge. Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

As used herein, the term "aryl" indicates aromatic groups containing only carbon in the aromatic ring or rings. Typical aryl groups contain 1 to 3 separate, fused, or pendant rings and 6 to 18 ring atoms, without heteroatoms as ring members. When indicated, such aryl groups may be further substituted with carbon or non-carbon atoms or groups. Such substitution may include fusion to a 5 to 7-membered saturated cyclic group that optionally contains 1 or 2 heteroatoms independently chosen from N, O, and S, to form, for example, a 3,4-methylenedioxyphenyl group. Aryl groups include, for example, phenyl, naphthyl, including 1-naphthyl and 2-naphthyl, and bi-phenyl.

The term ester alkyl indicates and alkyl group as define above attached through an ester linkage, i.e. a group of the formula $-O(C=O)$alkyl.

"Alkoxy carbonyl" refers to an alkoxy group adjacent a carbonyl group, i.e., a group of the formula alkyl —O(C=O)—.

In the term arylalkyl, aryl and alkyl are as defined above, and the point of attachment is on the alkyl group. This term encompasses, but is not limited to, benzyl, phenylethyl, and piperonyl.

An effective stabilizer composition for halogen-containing vinyl polymers comprises a zinc compound; a dihydropyridine or a polydihydropyridine, or both; in combination with a beta-diketone, and a latent mercaptan. These combinations provide unexpectedly improved early color hold over prior art compositions.

The terms "blocked mercaptan" and "latent mercaptan" are used interchangeably herein to mean a thioether that degrades to liberate a free mercaptan. The particular substituents of the latent mercaptan are selected so as to provide stability at lower temperatures, e.g., room temperature, but to degrade at the higher temperatures used to process halogen-containing vinyl polymers. The blocking group effectively masks the offensive odor of the mercaptan. The latent mercaptan is of Formula (1):

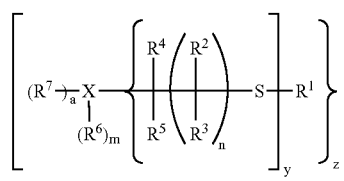

(1)

wherein a=0 or 1, m=0 or 1, n=0 or 1, and y=1-4 with the proviso that when y=1, z=1-4 and when y is greater than 1, z=1.

$R^1$ in Formula 1 is a monovalent, divalent, trivalent, or tetravalent $C_{1-52}$ alkyl, alkenyl, cycloalkyl, cycloalkenyl, aryl, alkaryl, aralkyl, aralkenyl, hydroxyalkyl, dihydroxyalkyl, hydroxy(polyalkoxy)alkyl, alkoxyalkyl, hydroxyalkoxyalkyl, alkoxy(hydroxyalkyl), alkoxy(acyloxyalkyl), alkoxy(polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy(polyalkoxy)alkyl, benzoyloxy(polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy)carbonylalkyl, mercaptoalkyl, mercaptoalkenyl, mercaptoalkoxycarbonylalkyl, mercaptoalkoxycarbonylalkenyl, alkoxycarbonyl(amido)alkyl, alkylcarbonyloxy(polyalkoxy)carbonylalkyl, tetrahydopyranyloxy(polyalkoxy)carbonylalkyl, tetrahydropyranyloxyalkyl, hydroxyaryl, mercaptoaryl or carboxyaryl group.

$R^2$, $R^3$, $R^4$, $R^5$, $R^6$, and $R^7$ are each independently a —H, —OH, —SH, acetyl, monovalent or divalent $C_{1-36}$ alkyl, alkenyl, aryl, haloaryl, alkaryl, aralkyl, hydroxyalkyl, mercaptoalkyl, hydroxyaryl, alkoxyaryl, alkoxyhydroxyaryl, or mercaptoaryl group.

X in Formula 1 is a monovalent, divalent, trivalent, or greater aryl, haloaryl, alkaryl, aralkaryl, hydroxyaryl, dihydroxyaryl, cycloalkyl aryl, arylcycloalkyl group, or a heteroatom. In addition, $R^6$ and $R^7$ may together form a heterocyclic moiety in conjunction with X as nitrogen when a is 1 and m is 1, and one of $R^1$, $R^3$, and $R^5$ may join with $R^7$ and X to form a heterocyclic moiety with X as a heteroatom selected from the group consisting of oxygen and sulfur when a=1 and m=0.

The foregoing is with the proviso that when X is aralkaryl, z is 1 or 2, $R^6$ and $R^7$ are —OH, a=1, and m=1, and with the further proviso that when $R^6$ is —OH or —SH, z=1.

Preferably, the alkyl groups and the alkyl portions of the foregoing groups, e.g., the alkyl portions of the hydroxyalkyl, mercaptoalkyl, alkoxyalkyl groups, and the like of Formula 4 contain from 1 to 20 carbon atoms and may have up to 3 ethylenic double bonds.

Examples of the latent mercaptans include, for example, compounds having the following formulas, as each relates to Formula (1):

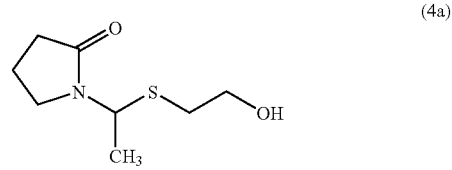

(4a)

wherein a=1, m=1, n=0; y=1, z=1, $R^1$ is 2-hydroxyethyl, $R^4$ is hydrogen, $R^5$ is methyl, X is nitrogen and $R^6$ and $R^7$ together form a heterocyclic moiety in conjunction with X;

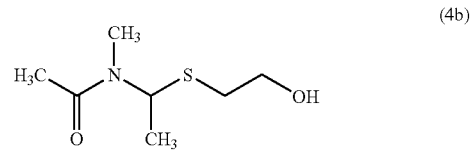

(4b)

wherein a=1, m=1, n=0; y=1, z=1, $R^1$ is 2-hydroxyethyl $R^4$ is hydrogen, $R^5$ is methyl, $R^6$ is acetyl, and $R^7$ is methyl, and X is nitrogen;

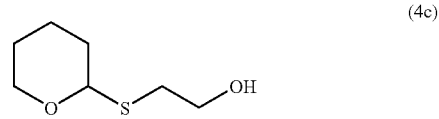

(4c)

wherein a=1, m=0, n=0; y=1, z=1, $R^1$ is 2-hydroxyethyl, $R^4$ is hydrogen, X is oxygen, and $R^5$ and $R^7$ together form a heterocyclic moiety in conjunction with X;

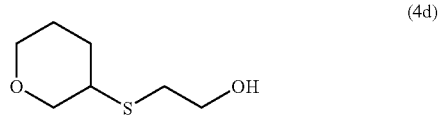

(4d)

wherein a=1, m=0, n=1, y=1, z=1, $R^1$ is 2-hydroxyethyl, $R^2$, $R^4$, and $R^5$ are hydrogen, X is oxygen, and $R^3$ and $R^7$ together form a heterocyclic moiety in conjunction with X;

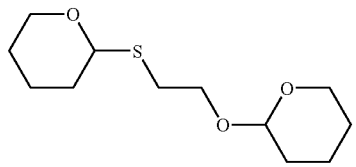
(4d)

wherein a=1, m=0, n=0, y=1, z=1, $R^1$ is 2-tetrahydro-pyranyloxyethyl, $R^4$ is hydrogen, X is oxygen, and $R^5$ and $R^7$ together form a heterocyclic moiety in conjunction with X;

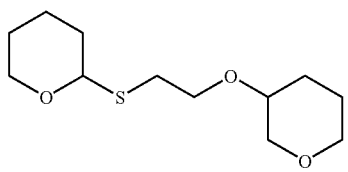
(4e)

wherein a=1, m=0, n=0, y=1, z=1, $R^1$ is 3-tetrahydro-pyranyloxyethyl, $R^4$ is hydrogen, X is oxygen, and $R^5$ and $R^7$ together form a heterocyclic moiety in conjunction with X;

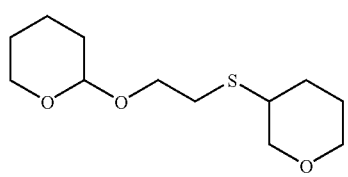
(4f)

wherein a=1, m=0, n=1, y=1, z=1, $R^1$ is 2-tetrahydro-pyranyloxyethyl, $R^2$, $R^4$, and $R^5$ are hydrogen, X is oxygen, and $R^3$ and $R^7$ together form a heterocyclic moiety in conjunction with X;

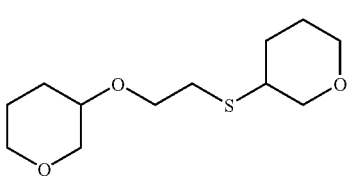
(4f)

wherein a=1, m=0, n=1, y=1, z=1, $R^1$ is 3-tetrahydro-pyranyloxyethyl, $R^2$, $R^4$ and $R^5$ are hydrogen, X is oxygen, and $R^3$ and $R^7$ together form a heterocyclic moiety in conjunction with X;

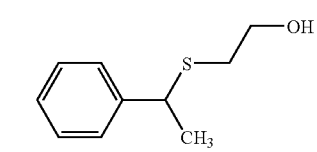
(4g)

wherein a=0, m=0, n=0, y=1, z=1, $R^1$ is 2-hydroxyethyl, $R^4$ is methyl, $R^5$ is hydrogen, and X is phenyl;

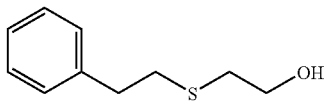
(4h)

wherein a=0, m=0, n=1, y=1, z=1, $R^1$ is 2-hydroxyethyl, $R^2$, $R^3$, $R^4$, and $R^5$ are hydrogen, and X is phenyl;

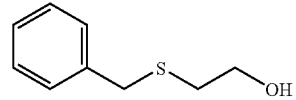
(4i)

wherein a=0, m=0, n=0, z=1; y=1, $R^1$ is 2-hydroxyethyl, $R^4$ and $R^5$ are hydrogen, and X is phenyl;

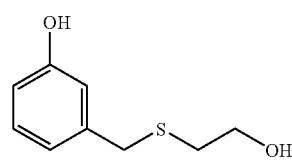
(4j)

wherein a=1, m=0, n=0, y=1, z=1, $R^1$ is 2-hydroxyethyl, $R^4$ and $R^5$ are hydrogen, $R^7$ is m-hydroxy, and X is phenyl;

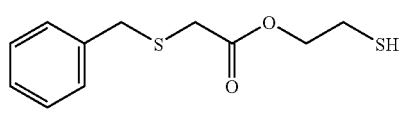
(4k)

wherein a=0, m=0, n=0, y=1, z=1, $R^1$ is 2-mercaptoethoxycarbonylmethyl, $R^4$ and $R^5$ are hydrogen, and X is phenyl;

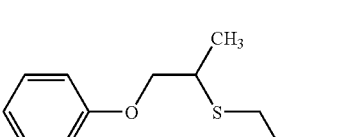
(4l)

wherein a=1, m=0, n=1, y=1, z=1, $R^1$ is 2-hydroxyethyl, $R^2$, $R^4$ and $R^5$ are hydrogen, $R^3$ is methyl, $R^7$ is phenyl, and X is oxygen;

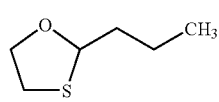
(4m)

wherein a=1, m=0, n=0, y=1, z=1, R⁴ is hydrogen, R⁵ is propyl, X is oxygen, R¹ and R⁷ together form a heterocyclic moiety in conjunction with X;

(4n)
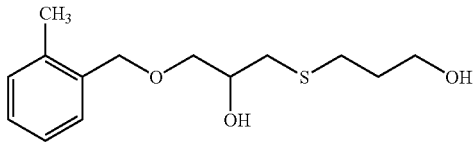

wherein a=0, m=1, n=1, y=1, z=1, R¹ is 3-hydroxypropyl, R², R³, R⁴ and R⁶ are hydrogen, R⁵ is 2-(methyleneoxymethylene)tolyl, and X is oxygen;

(4o)
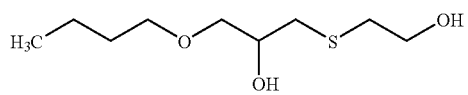

wherein a=1, m=0, n=1, y=1, z=1, R¹ is 2-hydroxyethyl, R², R³, R⁴ and R⁷ are hydrogen, R⁵ is butoxymethylene, and X is oxygen;

(4p)
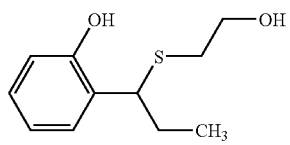

wherein a=1, m=0, n=0, y=1, z=1, R¹ is 2-hydroxyethyl, R⁴ is hydrogen, R⁵ is ethyl, R⁷ is o-hydroxy, and X is phenyl;

(4q)
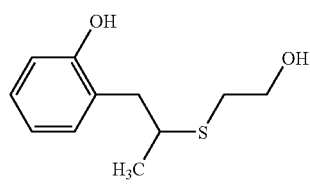

wherein a=1, m=0, n=1, y=1, z=1, R¹ is 2-hydroxyethyl, R¹, R⁴ and R⁵ are hydrogen, R² is methyl, R⁷ is o-hydroxy, and X is phenyl;

(4r)
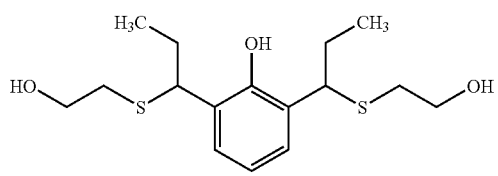

wherein a=1, m=0, n=0, y=1, z=2, R¹ is 2-hydroxyethyl, R⁴ hydrogen, R⁵ is ethyl, R⁷ is hydroxy, and X is phenyl;

(4s)
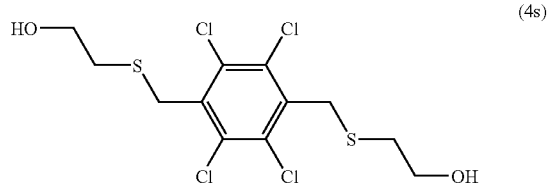

wherein a=0, m=0, n=0, y=1, z=2, R¹ is 2-hydroxyethyl, R⁴ and R⁵ are hydrogen, and X is tetrachlorophenyl;

(4t)
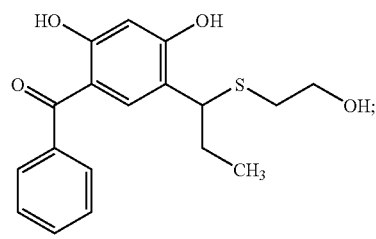

wherein a=1, m=0, n=0, y=1, z=1, R¹ is 2-hydroxyethyl, R⁴ is hydrogen, R⁵ is ethyl, R⁷ is m-phenylcarbonyl, and X is o,p-dihydroxyphenyl;

(4u)
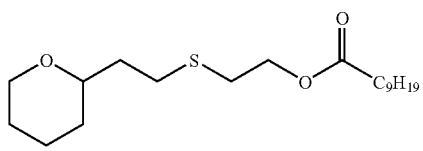

wherein a=1, m=0, n=0; y=1, z is 1, R¹ is nonoyloxyethyl, R⁴ is hydrogen, X is oxygen, and R⁵ and R⁷ are joined to form a heterocycle with X; and (4w)
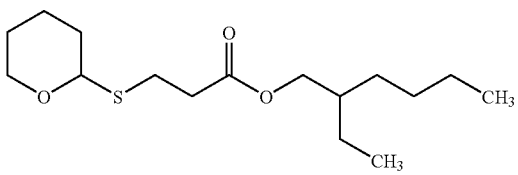

wherein a=1, m=0, n=0, y=1, z=1, R¹ is 2-ethylhexyloxycarbonylethyl, R⁴ is hydrogen, X is oxygen, and R⁵ and R⁷ together form a heterocyclic moiety in conjunction with X.

A suitable class of latent mercaptans includes, for example, the 2-S-(tetrahydropyranyl)thioglycolic acid esters of C₂₋₁₈ alkyl alcohols such as 2-ethylhexanol, octanol, and dodecanol, and the furanyl homologs thereof. Suitable latent mercaptans include, for example, 2-S-tetrahydropyranal thioethyltallate, 2-S-tetrahydropyranal-2-ethylhexylthioglycolate, and mixtures thereof.

Latent mercaptans may be formed by reacting a mercaptan-containing organic compound with a blocking group.

Suitable mercaptan-containing organic compounds include, for example, alkyl mercaptans, mercapto esters, mercapto alcohols, mercapto acids, and the like. Alkyl mercaptans having from 1 to about 400 carbon atoms and from 1 to 4 mercapto groups are suitable. Mercaptan-containing organic compounds that include $R^1$ have structures illustrated by the formulas:

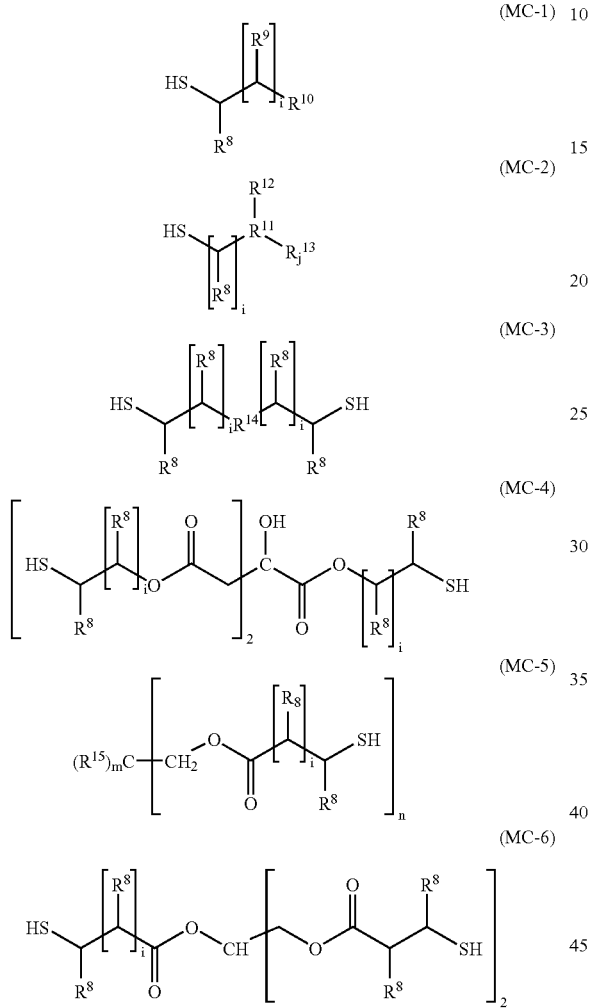

(MC-1)
(MC-2)
(MC-3)
(MC-4)
(MC-5)
(MC-6)

wherein
i=0-6; j=0-3; m=1-2; n=2-3, with the proviso that m+n=4;
$R^8$ is —H, $C_{1-18}$ alkyl, or $C_{1-36}$ aryl;
$R^9$ and $R^{10}$ are each independently —H, —OH, —SH, $C_{1-8}$ alkyl, aryl, $R^{16}C(=O)O$—, or $R^{16}OC(=O)$—;
$R^{11}$ is cycloalkyl, cycloalkenyl or phenyl;
$R^{12}$ is —H, —OH, —SH, $C_{1-18}$ alkyl, $C_{6-18}$ aryl, $R^{16}C(=O)O$—, $R^{16}OC(=O)$—, with the proviso that in formula MC2, when $R^{11}$ is phenyl, $R^{12}$ is —OH and i=0, the —SH groups are on non-adjacent carbon atoms;
$R^{13}$ is —H or a divalent group which may contain halogen, hydroxy, mercapto or alkyl substituents and which when $R^{11}$ is phenyl combines with the phenyl to form a naphthalene ring;
$R^{14}$ is divalent, and is —OC(=O)$R^{17}$C(=O)O—, —OC(=O)CH=CHC(=O)O—, or —C(=O)O$R^{17}$OC(=O)—;

$R^{15}$ is $C_{1-12}$ alkyl, preferably —$CH_3$, —$CH_2CH_3$; $C_{1-12}$ hydroxyalkyl, preferably hydroxymethyl; or

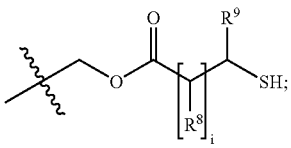

$R^{16}$ is —H, $C_{1-24}$ alkyl, $C_{1-24}$ alkenyl, $C_{6-36}$ aryl, $C_{7-36}$ aralkyl, $C_{7-36}$ alkaryl, $C_{1-16}$ cycloalkyl, or $C_{1-36}$ cycloalkenyl; and
$R^{17}$ is $C_{6-36}$ arylene, $C_{1-8}$ alkylenyl, —($CH_2CH_2O$)$_b CH_2CH_2$— where b=1-6, or

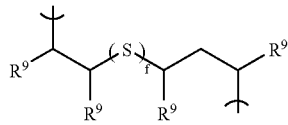

where f=1 or 2.

In one embodiment, the mercaptan-containing organic compounds are compounds according to formula MC1 where $R^8$ is —H; $R^9$ is —H; $R^{10}$ is —OH, $R^{16}C(=O)O$—, or $R^{16}OC(=O)$—, and i=1; compounds according to formula MC2 where $R^{11}$ is phenyl; $R^8$ is —H; $R^{12}$ is —H; $R^{13}$ is —H; j=1, and i=1; compounds according to formula MC3 where $R^8$ is —H; $R^{14}$ is —OC(=O)CH=CHC(=O)O—; and i=1; compounds according to formula MC4 where $R^9$ is —H; and i=1; and compounds according to formula MC5 where $R^{15}$ is —$C_2H_5$ or

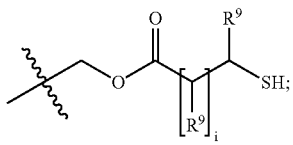

and $R^8$ is —H; and i=1; and compounds according to formula MC6 where $R^8$ is —H; and i=1.

Suitable mercaptan-containing organic compounds within the scope of formula MC1 include, for example, the compounds shown in Table 1:

TABLE 1

| MC1a | $HSC_{12}H_{25}$ |
|------|------------------|
| MC1b | $HSCH_2\overset{O}{\overset{\|}{C}}OH$ |
| MC1c | $HS\overset{\|}{\underset{CH_3}{CH}}\overset{O}{\overset{\|}{C}}OC_8H_{17}$ |

TABLE 1-continued

| | |
|---|---|
| MC1d | $$\text{HSCHCOC}_{12}\text{H}_{25}$$ with phenyl group, C=O |
| MC1e | $$\text{HSCH}_2\text{COC}_8\text{H}_{17}, \, C=O$$ |
| MC1f | $$\text{HSCH}_2\text{COC}_2\text{H}_5, \, C=O$$ |
| MC1g | $$\text{HSCH}_2\text{CHOH} \mid \text{CH}_3$$ |
| MC1h | $$\text{HSCH}_2\text{CH}_2\text{COH}, \, C=O$$ |
| MC1i | $$\text{HSCH}_2\text{CH}_2\text{CH}_2\text{OH}$$ |
| MC1j | $$\text{HSCH}_2\text{COC}_{18}\text{H}_{37}, \, C=O$$ |
| MC1k | $$\text{HSCH}_2\text{CHOCC}_8\text{H}_{17} \mid \text{CH}_3, \, C=O$$ |
| MC1l | $$\text{HSCHCOCH}_3 \mid \text{C}_{10}\text{H}_{21}, \, C=O$$ |
| MC1m | $$\text{HSCH}_2\text{CH}_2\text{OCC}_{17}\text{H}_{35}, \, C=O$$ |
| MC1n | $$\text{HSCH}_2\text{CH}_2\text{OCC}_{11}\text{H}_{23}, \, C=O$$ |
| MC1o | $$\text{HSCH}_2\text{CHOH} \mid \text{C}_9\text{H}_{19}$$ |
| MC1p | $$\text{HSCH}_2\text{CH}_2\text{OH}$$ |
| MC1q | $$\text{HSCH}_2\text{CH}_2\text{COC}_8\text{H}_{17}, \, C=O$$ |
| MC1r | $$\text{HSCH}_2\text{CHOCCH}_3 \mid \text{C}_9\text{H}_{19}, \, C=O$$ |
| MC1s | $$\text{HSCHCOH} \mid \text{C}_{10}\text{H}_{21}, \, C=O$$ |
| MC1t | $$\text{HSCH}_2\text{CH}_2\text{OCC}_{17}\text{H}_{33}, \, C=O$$ |
| MC1u | $$\text{HSCH}_2\text{CH}_2\text{CH}_2\text{OCC}_8\text{H}_{17}, \, C=O$$ |
| MC1v | $$\text{HSCH}_2\text{CH}_2\text{COC}_{11}\text{H}_{23}, \, C=O$$ |

Suitable mercaptan-containing organic compounds within the scope of formula MC2 include, for example, the following compounds:

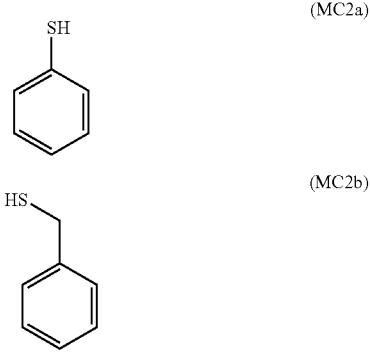

(MC2a) thiophenol (SH on benzene ring)

(MC2b) benzyl mercaptan (HS-CH2-benzene)

Suitable mercaptan-containing organic compounds within the scope of formula MC3 include, for example, the compounds shown in Table 2:

TABLE 2

| | |
|---|---|
| MC3a | $$\text{HSCH}_2\text{COCH}_2\text{CH}_2\text{OCCH}_2\text{SH}, \, \text{two C=O}$$ |
| MC3b | $$\text{HSCH}_2\text{CH}_2\text{OCCH}_2\text{CH}_2\text{COCH}_2\text{CH}_2\text{SH}, \, \text{two C=O}$$ |
| MC3c | $$\text{HSCH}_2\text{CH}_2\text{OCCH}=\text{CHCOCH}_2\text{CH}_2\text{SH}, \, \text{two C=O}$$ |
| MC3d | $$\text{HSCH}_2\text{COCH}_2\text{CH}_2\text{OCH}_2\text{CH}_2\text{OCCH}_2\text{SH}, \, \text{two C=O}$$ |
| MC3e | $$\text{HSCH}_2\text{CO}(\text{CH}_2\text{CH}_2\text{O})_3\text{CH}_2\text{CH}_2\text{OCCH}_2\text{SH}, \, \text{two C=O}$$ |
| MC3f | $$\text{HSCH}_2\text{CH}_2\text{OC}(\text{CH}_2)_4\text{COCH}_2\text{CH}_2\text{SH}, \, \text{two C=O}$$ |

TABLE 2-continued

MC3g
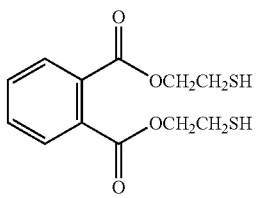

Suitable mercaptan-containing organic compounds within the scope of formula MC4 include, for example, the following compound:

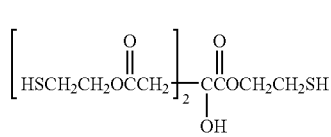 (MC4a)

Suitable mercaptan-containing organic compounds within the scope of formula MC5 include, for example, the following compounds:

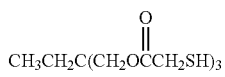 (MC5a)

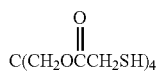 (MC5b)

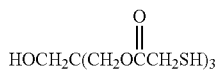 (MC5c)

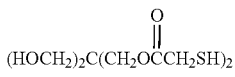 (MC5d)

Suitable mercaptan-containing organic compounds within the scope of formula MC6 include, for example, the following compounds:

 (MC6a)

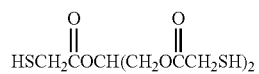 (MC6b)

Suitable blocking compounds for the formation of the latent mercaptoester are those compounds that are capable of furnishing a stabilized carbocation having a molecular structure in which several groups share the electron deficiency. For example, polarized, unsaturated compounds exemplified by 3,4-dihydropyran, 2-methoxy-3,4-dihydropyran, styrene, α-methylstyrene, vinyl benzyl chloride, indene, 2-vinylpyridine, N-vinylpyrrolidone, vinyl acetate, octadecyl vinyl ether, cyclohexyl divinyl ether, 2 ethylhexyl vinyl ether, ethylene glycol divinyl ether, ethyleneglycol monovinyl ether, allyl phenyl ether, trans-cinnamaldehyde, N-methyl-N-vinylacetamide, N-vinylcaprolactam, isoeugenol, and 2-propenylphenol. Other suitable compounds include, for example, 3,4-dihydro-2-methoxy-2H-pyran; 3,4-dihydro-2-ethoxy-2H-pyran; 3,4-dihydro-2-phenoxy-2H-pyran; 3,4-dihydro-2-formyl-2H-pyran; and 2,3-dihydrofuran. The 3,4-dihydro-2-formyl-2H-pyran is made by the Diels-Alder dimerization of acrolein at high temperatures and pressures. The 3,4-dihydro-2-alkoxy-2H-pyrans and 3,4-dihydro-2-phenoxy-2H-pyran are made by the reaction of the corresponding vinyl ether with acrolein in the presence of a catalytic amount of a zinc salt, e.g., zinc chloride. A variety of 3,4-dihydro-2H-pyrans having a substituent in the 2-position can be made by similar reactions. The products formed by the reaction of 1 and 2 moles of acrolein with the divinyl ether of an alkylene- or polyalkylene glycol are blocking agents, also. The latent mercaptans made from the di-(3,4-dihydropyranyl) ethers also have the potential of being chelating agents in the polymer compositions. Compounds having labile halogen atoms which split off as hydrogen chloride in a condensation reaction with the mercaptan, as exemplified by triphenylmethyl chloride, benzyl chloride, and bis(chloromethyl)benzene, are also suitable. The mercaptan may also be blocked by condensation with an aldehyde such as butyraldehyde or with a benzyl alcohol such as benzene dimethanol. The preferred blocking agents include 3,4-dihydropyran (DHP).

One suitable procedure for producing latent mercaptans comprises adding the mercapto group of the free mercaptan across the double bonds of polarized, unsaturated compounds ("Procedure A"). For example, the blocking compound, either neat or in solution, is added dropwise to a stirred mixture, under nitrogen atmosphere, of the mercaptan, acid catalyst, and optionally, a small percentage of antioxidant to inhibit group reactions, while maintaining the temperature at 10 to 70° C. Upon heating for 1 to 6 hours at 35 to 70° C., conversion to product may be monitored by gas chromatography and iodine titration for the SH group. The acid catalyst is removed (e.g., by an alkaline wash, or filtration if the catalyst is solid). The resulting product is dried (e.g., with magnesium sulfate), filtered, and any solvent removed under reduced pressure at less than 50° C. A solid phase catalyst may be used and then filtered out of the reaction mixture and regenerated for use in a subsequent synthesis. This method is suitable for production of N-2-hydroxyethylthioethyl-caprolactam from mercaptoethanol and N-vinylcaprolactam; the production of 2-S-(tetrahydropyranyl)thioethyldecanoate from mercaptoethyldecanoate (mercaptoethylcaproate) and 3,4-dihydropyran; 2H-dihydroindenylthio-ethanol from indene and mercaptoethanol; and bis(hydroxyethyl-thioethyl) cyclohexyl ether from mercaptoethanol and cyclohexyl di-vinyl ether. In like manner, the corresponding caprate, oleate, and tallate esters from the corresponding cyclohexyl ethers may be produced.

Alternatively, the condensation of a free mercaptan with a labile halogen-containing compound may be used. For example, a solution of sodium methoxide in methanol is added dropwise to a stirred mixture of the mercaptan and the halogen-containing compound under nitrogen atmosphere while maintaining the temperature below 50° C. Optionally, the reaction is allowed to proceed without the addition of a base source and the liberated hydrogen chloride is removed by nitrogen gas sweep and neutralized with the use of an external acid scrubber. Upon heating for 2 to 24 hours at a temperature of 50 to 70° C., conversion to product is monitored and isolated as above.

Suitable latent mercaptans may also be produced by reaction of a free mercaptan with a labile hydroxyl-containing compound. For example, the hydroxy-containing compound, either neat or in solution, is added to a stirred solution of the mercaptan, acid catalyst, and solvent under nitrogen atmosphere while maintaining the temperature below 45° C. Upon heating at 45 to 75° C. for 1 to 10 hours, conversion to product is monitored as above, and/or by monitoring the amount of water produced using a zeotropic distillation, typically at 60 to 120° C. Isolation may be carried out as described above. This procedure is useful to produce 1-(2-hydroxyphenyl)-1-S-(2-hydroxyethylthio) methane from 2-hydroxybenzyl alcohol and mercaptoethanol.

Reaction of a free mercaptan with a glycidyl ether may be conducted by adding the glycidyl ether (either neat or in solution) to a stirred mixture of the mercaptan and acid catalyst under nitrogen atmosphere at 25 to 60° C. Upon heating to 50 to 75° C. for 1 to 6 hours, conversion to product is monitored and product is isolated as described for procedure A. This procedure may be used to produce $C_9H_{19}C(=O)OCH_2CH(OH)CH_2SCH_2CH_2OH$ from mercaptoethanol and glycidyl neodecanoate.

foregoing R groups may be substituted or unsubstituted with groups that do not adversely affect use of the composition. A preferred substitutent is an alkoxy group. Preferably, $R^{18}$ is $OR^{21}$, wherein $R^{21}$ is a $C_1$-$C_6$ alkyl group. Each $R^{20}$ is independently hydrogen, oxygen, halogen, or a $C_1$-$C_{36}$ alkyl, alkenyl, aryl, alkaryl, or aralkyl group, wherein the carbon containing groups may be substituted or unsubstituted with groups that do not adversely affect use of the composition. $R^{26}$ is a hydrogen, $C_1$-$C_{20}$ alkyl group, $C_6$-$C_{36}$ aryl group, or a $C_2$-$C_{20}$ alkenyl group. Each of the foregoing may be substituted or unsubstituted with groups that do not adversely affect use of the composition. Preferably, $R^{26}$ is hydrogen. Suitable dihydropyridines include, for example, 3,5-bis (ethoxycarbonyl)-2,6-dimethyl-1,4-dihydropyridine.

Alternatively, or in addition to a dihydropyridine, a polydihydropyridine of formula (3) may be used

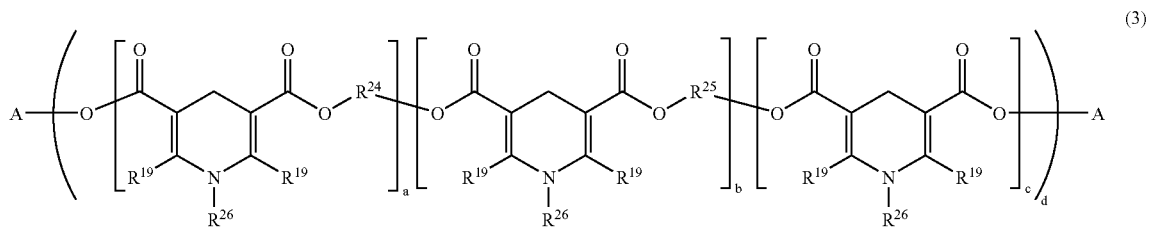

(3)

Reaction of a free mercaptan with an aldehyde to produce a latent mercaptan may be conducted by added the aldehyde to a stirred solution of the mercaptan, acid catalyst, and a zeotropic solvent under nitrogen atmosphere and heating to reflux, typically 65 to 120° C., for removal of reaction water. Completion of reaction is achieved after the theoretical amount of water has been collected. Alternatively, $BF_3$-etherate is added dropwise to a stirred solution of mercaptan, aldehyde, and ether under reflux conditions, and upon reflux for 1 to 6 hours, conversion to product is monitored by gas chromatography. Product may be isolated as in Procedure A.

Effective amounts of latent mercaptan are 0.05 to 2 parts per hundred parts resin (phr). Within this range, amounts of greater than 0.05 phr, or greater than 0.4 phr are preferred, and amounts of less than 2.0 phr, or less than 1.0 phr are preferred.

Effective dihydropyridines that provide a synergistic effect in combination with a latent mercaptan and a beta-diketone are of formula (2)

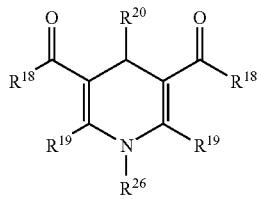

(2)

wherein each $R^{19}$ is independently a $C_1$ to $C_{36}$ alkyl group, preferably a methyl or ethyl group. Each $R^{18}$ is independently hydrogen, —$OR^{21}$, —$NHR^{21}$, or —$NR^{21}R^{22}$, wherein $R^{21}$ and $R^{22}$ are each independently a $C_1$-$C_{20}$ alkyl group, a $C_1$-$C_{20}$ alkoxy group, or a $C_2$-$C_{20}$ alkenyl group. Each of the wherein A is a $C_{6-18}$ aryl, $C_{2-22}$ alkenyl, or $C_{1-22}$ alkyl, each of which may be unsubstituted or substituted with a $C_1$-$C_{18}$ alkoxy, a $C_1$-$C_{18}$ alkylthio, hydroxy, acryloyloxy, methacryloyloxy, halogen, phenyl or naphthyl. Each $R^{19}$ is independently a $C_1$ to $C_{36}$ alkyl group, preferably a methyl or ethyl group. a and b are numbers from 0 to 20, c is 0 or 1, and d is a number from 1 to 6, with the proviso that d(a+b+c)>1 and (a+b)>0. $R^{24}$ and $R^{25}$ are each independently methylene, phenyl, or an alkylene group of the type (—$C_pH_{2p}$-Q-)$_t$$C_pH_{2p}$—, wherein p is a number from 2 to 18, t is a number from 0 to 10, and Q is oxygen or sulfur. $R^{26}$ is a hydrogen, $C_1$-$C_{20}$ alkyl group, a $C_6$-$C_{36}$ aryl group, or a $C_2$-$C_{20}$ alkenyl group. Each of the foregoing may be substituted or unsubstituted with groups that do not adversely affect use of the composition. Preferably, $R^{26}$ is hydrogen. Suitable polydihydropyridines may be, for example, thiodiethylene-bis[5-methoxycarbonyl-2,6-di methyl-1,4-dihydropyridine-3-carboxylate].

Effective amounts of dihydropyridine and/or polydihydropyridine are 0.05 to 1.0 phr. Within this range, amounts of greater than 0.05 phr, or greater than 0.5 phr are preferred, and amounts of less than 1.0 phr are preferred.

The dihydropyridines are used in combination with a beta-diketone having the structure shown in formula 4:

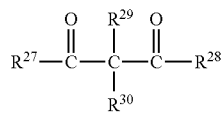

(4)

wherein $R^{27}$ is an alkyl group having greater than or equal to 10 carbon atoms, $R^{28}$ is a phenyl group or phenyl group substituted with up to 3 lower alkyl groups, and $R^{29}$ and $R^{30}$ are each independently hydrogen, $C_1$-$C_{18}$ alkyl groups, or $C_1$-$C_{18}$ alkyl groups substituted with halogen, hydroxy, alkoxy, ester alkyl or alkoxy carbonyl. Lower alkyl groups are alkyl groups having 1 to 8 carbon atoms, e.g. $C_1$-$C_8$ and $C_1$-$C_6$ alkyl groups. The R groups may have less than or equal to 30 carbon atoms, or less than or equal to 20 carbon atoms. In one embodiment, $R^{29}$ and $R^{30}$ are hydrogen.

Suitable beta-diketones include, for example, lauroylbenzoylmethane, myristoylbenzoylmethane, palmitoylbenzoylmethane, stearoylbenzoylmethane, octadecanoylbenzoylmethane, tetradecanoylbenzoylmethane, lauroyltoluylmethane, stearoyltoluylmethane, lauroylxyloylmethane, stearoylxyloylmethane, and combinations comprising one or more of the foregoing beta-diketones. In one embodiment, the beta-diketone for use in the stabilizer composition is stearoylbenzoylmethane.

Effective amounts of beta-diketone are 0.05 to 1 phr. Within this range, amounts of greater than 0.05 phr, or greater than 0.5 phr are preferred, and amounts of less than 1.0 phr are also preferred.

Suitable zinc compounds include organozinc compounds and inorganic zinc compounds. Suitable organozinc compounds have a Zn—O bond, and include, for example, zinc enolates, such as the enolates of acetylacetone, benzoylacetone, dibenzoylmethane, acetoacetates, benzoyl acetates and/or or zinc carboxylates, such as the zinc salts of aliphatic saturated $C_2$-$C_{22}$ carboxylates, aliphatic unsaturated $C_3$-$C_{22}$ carboxylates, aliphatic $C_2$-$C_{22}$ carboxylates that are substituted by at least one hydroxyl group or the chain of which is interrupted at least by one oxygen atom (oxa acids), $C_5$-$C_{22}$ cyclic and bicyclic carboxylates, or phenylcarboxylates that are unsubstituted or substituted by at least one hydroxyl group and/or $C_1$-$C_{16}$ alkyl-substituted. Preferred zinc carboxylates include, for example, the zinc salts of acetic acid, propionic acid, octanoic acid, neodecanoic acid, hexanoic acid, 2-ethylhexanoic acid, decanoic acid, dodecanoic acid, tridecanoic acid, palmitic acid, lauric acid, stearic acid, 9,10-dihydroxystearic acid, oleic acid, 3,6,9-trioxadecanoic acid, benzoic acid, p-tert-butylbenzoic acid, 3,5-di-tert-butyl-4-hydroxybenzoic acid, salicylic acid, p-tert-octylsalicylic acid, oxalic acid, malonic acid, succinic acid, glutaric acid, adipic acid, lactic acid, maleic acid, tartaric acid, cinnamic acid, glycolic acid, phthalic acid, terephthalic acid, hydroxyphthalic acid, or a mixture comprising at least one of the foregoing acids. Suitable zinc carboxylates are those of a carboxylic acid having 7 to 25 carbon atoms. In addition, inorganic zinc compounds, such as zinc oxide, zinc hydroxide, zinc sulfide, zinc chloride, or zinc carbonate, can also be used. The zinc compounds can be used in amounts of, for example, 0.001 to 10, or 0.01 to 5, or 0.01 to 3 phr.

Optionally, the composition may include additional co-stabilizers, such as, for example, epoxy compounds, polyols, sterically hindered amines, phosphites, mercaptocarboxylic esters, hydrotalcites, zeolites, dawsonites, and the like, and mixtures comprising one or more of the foregoing co-stabilizers.

Suitable epoxy compounds include, for example, epoxidized oils such as soybean oil, lard oil, olive oil, linseed oil, peanut oil, tung oil, cottonseed oil, and mixtures comprising one or more of the foregoing epoxy compounds. Other suitable epoxy compounds include, for example, epichlorohydrin/bis-phenol A resins, butoxypropylene oxide, glycidyl epoxystearate, epoxidized α-olefins, epoxidized glycidyl soyate, and epoxidized butyl toluate; the glycidyl esters of organic carboxylic acids, the glycidyl ethers of resorcinol, hydroquinone, 1,5-dihydroxynaphthalene, glycerine, pentaerythritol, and sorbitol; allyl glycidyl ether, butyl glycidyl ether, cyclohexane oxide, 4-(2,3-epoxypropoxy)acetophenone, mesityl oxide epoxide, 2-ethyl-3-propyl glycidamine, and mixtures comprising one or more of the foregoing epoxy compounds. The epoxy may be present in amounts of up to 30 phr.

Suitable polyols include, for example, pentaerythritol, dipentaerythritol, tripentaerythritol, bistrimethylolpropane, trimethylolpropane, inosite, polyvinyl alcohol, sorbitol, mannitol, lactose, tris(hydroxyethyl)isocyanurate, tetramethylolcyclohexanol, tetramethylolcyclopyranol, glycerol, diglycerol, polyglycerol, or mixtures comprising at least one of the foregoing. Preferred polyols include, for example, sorbitol and trimethylolpropane. The polyols can be used in an amount of, for example, 0.01 to 20 phr, or 0.1 to 10 phr.

Useful sterically hindered amines include, for example, monomeric, oligomeric, or polymeric 2,2,6,6-tetramethylpiperidine compounds. The nitrogen of the piperidine moiety may be substituted by, for example, hydrogen, $C_1$-$C_{12}$ alkyl, $C_3$-$C_8$ alkenyl, or $C_7$-$C_{12}$ aralkyl. The C-4 carbon of the piperidine moiety may be substituted by, for example, hydrogen or oxygen or nitrogen-containing groups. Suitable 2,2,6,6-tetramethylpiperidine compounds include, for example, 4-hydroxy-2,2,6,6-tetramethylpiperidine, 1-benzyl-4-hydroxy-2,2,6,6-tetramethylpiperidine, 4-stearoyloxy-2,2,6,6-tetramethylpiperidine, 1,2,2,6,6-pentamethylpiperidin-4-yl-beta-(3,5-di-tert-butyl-4-hydroxyphenyl) propionate, di(2,2,6,6-tetramethylpiperidin-4-yl) succinate, 1-acetyl-2,2,6,6-tetramethylpiperidin-4-yl acetate, trimellitic acid tri(2,2,6,6-tetramethylpiperidin-4-yl) ester, and the like. The piperidines can be used in an amount of, for example 0.01 to 1 phr, or 0.1 to 0.5 phr.

Suitable phosphites include, for example, trialkylphosphites such as trioctyl phosphite, tridecyl phosphite, tridodecyl phosphite, tri(tetradecyl) phosphite, tricyclohexyl phosphite, tristearyl phosphite, distearyl-pentaerythritol diphosphite, or trioleyl phosphite; triaryl phosphites such as triphenyl phosphite, tricresyl phosphite, or tris-p-nonylphenyl phosphite; alkyldiaryl phosphites such as phenyldidecyl phosphite or (2,4-di-tert-butylphenyl)didodecyl phosphite; dialkylaryl phosphites; thiophosphites such as trithiohexyl phosphite, trithiooctyl phosphite, trithiolauryl phosphite, or trithiobenzyl phosphite; or mixtures comprising any one or more of the foregoing phosphites. The phosphites can be used in an amount of, for example, 0.01 to 10, or 0.05 to 5, or 0.1 to 3 phr.

Suitable mercaptocarboxylic acid esters include, for example, esters of thioglycolic acid, thiomalic acid, mercaptopropionic acid, mercaptobenzoic acids, or thiolactic acid. Mercaptocarboxylic esters can be used in an amount of, for example, 0.01 to 10, or 0.05 to 5, or 0.1 to 3 phr.

Suitable hydrotalcites include, for example, those having the formula $Al_2O_3 6MgO\ CO_2\ 12H_2O$, $Mg_{4.5}\ Al_2(OH)_{13}\ CO_3\ 5H_2O$, $4MgO\ Al_2O_3\ CO_2\ 9H_2O$, $4MgO\ Al_2O_3 CO_2\ 6H_2O$, $ZnO\ 3MgO\ Al_2O_3\ CO_2\ 8-9H_2O$, or $ZnO\ 3MgO\ Al_2O_3\ CO_2\ 5-6H_2O$. Suitable zeolites (alkali and alkaline earth aluminosilicates) include, for example, zeolite A, sodalite, zeolite Y, zeolite X, zeolite P, zeolites MAP, zeolites K—F, potassium offretite, zeolite T, and the like, and mixtures comprising at least one of the foregoing zeolites. Hydrotalcites and/or zeolites can be used in an amount of, for example, 0.1 to 20 phr, advantageously at least 0.1 phr. The hydrotalcite and/or zeolites may also be used in an amount of less than 10 phr, or less than 5 phr.

As used herein, the term halogen-containing vinyl polymer means a halogen-containing polymer in which the halogens are attached directly to a carbon atom. Suitable halogen-containing polymers include, for example, chlorinated polyethylene having about 14 to about 75%, e.g., about 27%, chlorine by weight, chlorinated natural and synthetic rubber, rubber hydrochloride, chlorinated polystyrene, chlorinated poly(vinylidene chloride), chlorinated poly(vinyl chloride), poly(vinyl bromide), poly(vinyl fluoride), other vinyl chloride polymers, and mixtures comprising one or more of the foregoing polymers. The vinyl chloride polymers known as polyvinyl chloride (PVC) are made from vinyl chloride monomers alone or a mixture of monomers comprising, preferably, at least about 70% by weight of vinyl chloride, based on the total monomer weight. Suitable co-monomers include, for example, vinyl acetate, vinyl butyrate, vinyl benzoate, vinylidene chloride, trichloroethylene, 1-fluoro-2-chloroethylene, diethyl fumarate, diethyl maleate, methyl acrylate, 2-ethylhexyl acrylate, methyl alpha-chloroacrylate, methyl methacrylate, ethyl methacrylate, butyl methacrylate, styrene, vinyl ketones such as vinyl methyl ketone and vinyl phenyl ketone, acrylonitrile, chloroacrylonitrile, allylidene diacetate, chloroallylidene diacetate, and vinyl ethers such as vinyl ethyl ether, vinyl phenyl ether, the vinyl ether prepared by the reaction of one mole of acrolein with one mole of ethylene glycol divinyl ether, and mixtures comprising one or more of the foregoing co-monomers. Suitable halogen-containing vinyl copolymers include, for example, vinyl chloride-vinyl acetate, vinyl chloride-vinyl acetate (87:13), vinyl chloride-vinyl acetate-maleic anhydride (86:13:1), vinyl chloride-vinylidene chloride (95:5); vinyl chloride-diethyl fumarate (95:5), vinyl chloride 2-ethylhexyl acrylate (80:20), and, mixtures comprising one or more of the Foregoing copolymers.

A rigid halogen-containing vinyl polymer composition is one that does not contain a plasticizer. A semi-rigid halogen-containing vinyl polymer composition contains 1 to 25 parts of a plasticizer per 100 parts by weight of the halogen-containing vinyl polymer. A flexible halogen-containing vinyl polymer, composition contains 25 to 100 parts of a plasticizer per 100 parts by weight of the halogen-containing vinyl polymer. Suitable plasticizers include, for example, alkyl esters of polyacids in which there are from 1 to 3 alkyl groups having from 8 to 12 carbon atoms. Suitable alkyl groups of the alkyl ester include, for example, n-octyl, 2-ethylhexyl, decyl, dodecyl, and mixtures comprising one or more of the foregoing alkyl groups. Suitable polyacids for the alkyl ester include, for example, phthalic acid, trimellitic acid, benzoic acid, adipic acid, sebacic acid, glutaric acid, phosphates, and the like. Polymeric plasticizers are also suitable.

Optionally, the halogen-containing polymer compositions may include other conventional additives such as, for example, antioxidants, lubricants, fillers, pigments, impact modifiers, processing aids, blowing agents, dyes, ultraviolet light absorbing agents, densifying agents, biocides, and mixtures comprising one or more of the foregoing additives. Suitable amounts of the foregoing additives are readily determined by one of ordinary skill in the art depending on the desired final properties and end use of the compositions. In general, each additive is present in an amount of 0.01 to 10 wt %, or 0.1 to 5 wt %, based on the total weight of the halogen-containing vinyl polymer.

Suitable antioxidants include, for example, phenolic antioxidants such as 2,6-di-t-butyl-p-cresol, butylated hydroxyanisole, 4,4'-thiobis(6-t-butyl-m-cresol), 4,4'-cyclohexylidenediphenol, 2,5-di-t-amyl hydroquinone, 4,4'-butylidene bis(6-t-buytl-m-cresol), hydroquinone monobenzyl ether, 2,2'-methylene-bis(4-methyl-6-t-butyl phenol), 2-t-butyl-4-dodecyloxy phenol, p-amino phenol, N-lauryloxy-p-amino phenol, 4,4'-thiobis(3-methyl-6-t-butyl phenol), bis[o-(1,1,3,3-tetramethyl butyl)phenol] sulfide, 4-dodecyoxy-2-hydroxybenzophenone, n-dodecyl ester of 3-hydroxy-4-(phenyl carbonyl)phenoxyacetic acid, t-butyl phenol, and mixtures comprising one or more of the foregoing antioxidants.

Suitable lubricants include, for example, paraffin waxes, salts of fatty acids, low molecular weight polyethylene (i.e., polyethylene wax), fatty acid amides (i.e., laurimide and stearamide), bis amides (i.e., decamethylene, bisamide), fatty add esters (e.g., butyl stearate, glyceryl stearate, linseed oil, palm oil, decytoleate, corn oil, cottonseed oil, and the like), and mixtures comprising one or more of the foregoing lubricants. Suitable fillers include, for example, calcined clays, calcium carbonate, talcs, and mixtures comprising one or more of the foregoing fillers. Suitable pigments include, for example, titanium dioxide, carbon black, iron oxide, and mixtures comprising one or more of the foregoing pigments.

In general, the above-described thermal stabilizer compositions are provided as a one-part mixture formulated so as to provide one or more zinc compounds, one or more latent mercaptans of formula (1) one or more dihydropyridines or polydihydropyridines of formulas (2 or 3), and at least one beta-diketone of formula (4), in amounts effective to result in a synergistic improvement in thermal stability. As other optional additives may also be present in the one-part mixture, the particular amount of each component may vary from 0.1 to 99.9% percent by weight, preferably 1.0 to 99.0% by weight based on the total weight of the one-part mixture. Particular amounts effective to result a synergistic improvement in thermal stability are readily determined by one of ordinary skill in the art.

The halogen-containing vinyl polymer compositions may be prepared by blending under low or high shear. Likewise, the thermal stabilizer compositions may be incorporated in the halogen-containing vinyl polymer composition by mixing the components thereof and the polymer in an appropriate mill or mixer or by another method that provides uniform distribution of the stabilizer throughout the polymer. Depending on the compatibility and physical state (i.e., liquid or solid) the components of the blend may require heating to form a uniform stabilized polymer composition having the desired performance characteristics.

The stabilized halogen-containing vinyl polymer composition can be used to form a variety of rigid articles such as, for example, house siding, window profiles, and pipe using a variety of techniques to shape the articles such as, for example, molding, extrusion, and injection molding.

In one embodiment, a synergistic combination comprising a zinc compound, a latent mercaptan, dihydropyridine, and/or a polydihydropyridine, and a beta-diketone provides improved early color, i.e., prolonged whiteness during initial processing. Alternatively, a synergistic combination comprising the zinc compound, the latent mercaptan, the dihydropyridines, and the beta-diketone can provide improved long-term color stability, preferably together with the improved early color.

The invention is further illustrated by the following examples, wherein PVC compositions for thermal stability testing were prepared by mixing, under high shear, 100 parts by weight of PVC resin, pigment (0.2 phr), mold release agents (0.5-2 phr), co-stabilizer (0.01-2 phr of a phosphite), and lubricants (0.2 to 2.0 phr), together with the stabilizer compositions shown in the Tables. The mixed compositions were then heated in a two-roll mill at 390° F. (199° C.) and samples were removed at the indicated time intervals and formed into chips. Color change (as reflected by dE) and whiteness (WI) of each chip was measured using a Hunter Labs (L, a, b) colorimeter.

Examples 1-4 show the synergistic effects obtained using a combination of zinc octoate, 2-5-tetrahydropyranal-2-ethylhexylthioglycolate, 3,5-bis(ethoxycarbonyl)-2,6-dimethyl-1,4-dihydropyridine and stearoylbenzoylmethane mixed in a brabender mixer. Theic is tris(hydroxymethyl)isocyanurate.

TABLE 1

| Component | Example No. | | | |
|---|---|---|---|---|
| | 1* | 2 | 3 | 4 |
| Latent mercaptan: 2-5-tetrahydropyranal-2-ethylhexylthioglycolate | 0.4 | 0.4 | 0.4 | 0.4 |
| Beta-diketone: Stearoylbenzoylmethane | 0.10 | 0.05 | 0.05 | 0.05 |
| DHP: 3,5-bis(ethoxycarbonyl)-2,6-dimethyl-1,4-dihydropyridine | 0 | 0.05 | 0.05 | 0.05 |
| Distearyl pentarythritol diphosphite co-stabilizer | 0 | 0 | 0 | 0.025 |
| Theic | 0.15 | 0.15 | 0.15 | 0.15 |
| Zinc octoate | 0.15 | 0.15 | 0.15 | 0.15 |
| dE at minute | | | | |
| 1 | 16.5 | 13.8 | 15.1 | 15.6 |
| 2 | 17.8 | 14.7 | 15.9 | 15.5 |
| 3 | 18.3 | 15.7 | 16.2 | 16.4 |
| 4 | 18.3 | 15 | 15.6 | 15.4 |
| 5 | 19.6 | 15.6 | 15.3 | 15.6 |
| 6 | 24.1 | 16.7 | 16.9 | 17.4 |
| 7 | 34.0 | 22.4 | 20.5 | 20.8 |
| 8 | 50.5 | 32 | 28.7 | 35.2 |
| 9 | | 67.2 | 48 | 67.5 |

*Control

In example 2, the 3,5-bis(ethoxycarbonyl)-2,6-dimethyl-1,4-dihydropyridine and stearoylbenzoylmethane were added in the form of a combined "wax pack." In examples 3 and 4, the 3,5-bis(ethoxycarbonyl)-2,6-dimethyl-1,4-dihydropyridine and stearoylbenzoylmethane were added separately. Examples 2-4 show the synergistic effects obtained using a combination of zinc octoate, 2-5-tetrahydropyranal-2-ethylhexylthioglycolate, 3,5-bis(ethoxycarbonyl)-2,6-dimethyl-1,4-dihydro3,5-bis(ethoxycarbonyl)-2,6-dimethyl-1,4-dihydro, and stearoylbenzoylmethane mixed in a dynamic mill.

Table 1 shows that the four part combination of a zinc compound, a latent mercaptan, a dihydropyridines, and a beta-diketone exhibits improved early color (Example 3) compared to a three part combination of a zinc compound, a latent mercaptan and a dihydropyridine (Example 1) or a three part combination of a zinc compound, a latent mercaptan, and a large amount of beta-diketone (Example 2). Addition of a phosphite stabilizer to the four part stabilizer composition does not appreciably improve the early color (Example 4). Thus, the synergistic combination of a zinc compound, a latent mercaptan, a dihydropyridines, and a beta-diketone results in improved early color, and at lower stabilizer levels than the two part combination of a latent mercaptan and a beta-diketone.

Examples 5-8 show the synergistic effects obtained using a combination of zinc octoate, 2-5-tetrahydropyranal-2-ethylhexylthioglycolate, 3,5-bis(ethoxycarbonyl)-2,6-dimethyl-1,4-dihydropyridine, and stearoylbenzoylmethane mixed in a brabender mixer.

TABLE 2

| Component | Example No. | | | |
|---|---|---|---|---|
| | 5* | 6* | 7 | 8* |
| Latent mercaptan: 2-5-tetrahydropyranal-2-ethylhexylthioglycolate | 0.4 | 0.4 | 0.4 | 0.4 |
| Beta-diketone: Stearoylbenzoylmethane | 0.10 | 0 | 0.05 | 0 |
| DHP: 3,5-bis(ethoxycarbonyl)-2,6-dimethyl-1,4-dihydropyridine | 0 | 0.10 | 0.05 | 0 |
| Zinc octoate | 0.15 | 0.15 | 0.15 | 0.15 |
| Theic | 0.15 | 0.15 | 0.15 | 0.15 |
| WI at minute | | | | |
| 1 | 46 | 53.8 | 54.2 | 27 |
| 2 | 30.8 | 26.2 | 38.9 | −12 |
| 3 | 27.4 | 25.5 | 34.0 | −4.3 |
| 4 | 26.4 | 36.1 | 38.6 | 6.1 |
| 5 | 18 | 26.2 | 31.1 | 8.2 |
| 6 | −22 | 8.2 | 8:7 | −14.9 |
| 7 | −35.2 | −8.2 | −26 | −25.3 |
| 8 | −9.6 | | −8.2 | −8.9 |

*Control

Table 2 shows that, at the same amount of total added stabilizer, the four part combination of a zinc compound, a latent mercaptan, a dihydropyridines, and a beta-diketone exhibits improved early whiteness (Example 7) compared to a three part combination of a zinc compound, a latent mercaptan and a dihydropyridine (Example 5) or a combination of a zinc compound, a latent mercaptan and a large amount of beta-diketone (Example 6). As shown in Example 8, both the three part and four part combinations with the latent mercaptan, dihydropyridine and/or beta-diketone show significantly improved early color compared to the compositions with only the latent mercaptan.

Examples 9-12 show the synergistic effects obtained using a combination of zinc octoate, 2-5-tetrahydropyranal-2-ethylhexylthioglycolate, 3,5-bis(ethoxycarbonyl)-2,6-dimethyl-1,4-dihydropyridine, and stearoylbenzoylmethane mixed in a brabender mixer at various concentrations of the dihydropyridine and beta-diketone.

TABLE 3

| Component | Example No. | | | |
|---|---|---|---|---|
| | 9 | 10 | 11 | 12 |
| Latent mercaptan: 2-5-tetrahydropyranal-2-ethylhexylthioglycolate | 0.4 | 0.4 | 0.4 | 0.4 |
| Beta-diketone: Stearoylbenzoylmethane | 0.05 | 0.075 | 0.025 | 0.1 |
| DHP: 3,5-bis(ethoxycarbonyl)-2,6-dimethyl-1,4-dihydropyridine | 0.05 | 0.025 | 0.075 | 0.1 |
| Zinc octoate | 0.15 | 0.15 | 0.15 | 0.15 |
| Theic | 0.15 | 0.15 | 0.15 | 0.15 |
| dE at minute | | | | |
| 1 | 14.6 | 15.3 | 16.4 | 14.8 |
| 2 | 17.1 | 17.1 | 17.9 | 16.0 |
| 3 | 16.8 | 17.4 | 18.9 | 17.0 |
| 4 | 16.4 | 16.7 | 17.8 | 16.3 |
| 5 | 18.4 | 17.5 | 19.72 | 17.9 |
| 6 | 24.1 | 21.3 | 26.3 | 22.9 |
| 7 | 64.4 | 29 | 72.2 | 44.7 |
| 8 | | 48.4 | | |

As shown in Table 3, at the same total amount of added stabilizer, an excess of beta-diketone as compared to dihydropyridine results in an improvement in stabilization at greater than 7 minutes (compare Examples 9-11), while the earlier time points have similar color. Comparing Examples 9 and 12, doubling the amount of beta-diketone and dihydropyridine gives similar color at 1 to 6 minutes, and some improvement at 7 minutes.

Examples 13-15 show the synergistic effects obtained using a combination of zinc chloride, 2-5-tetrahydropyranal-2-ethylhexylthioglycolate, 3,5-bis(ethoxycarbonyl)-2,6-dimethyl-1,4-dihydropyridine, and stearoylbenzoylmethane mixed in a brabender mixer.

TABLE 4

| Component | Example No. 13* | 14* | 15 |
|---|---|---|---|
| Latent mercaptan: 2-5-tetrahydropyranal-2-ethylhexylthioglycolate | 0.4 | 0.4 | 0.4 |
| Beta-diketone: Stearoylbenzoylmethane | 0 | 0.05 | 0.05 |
| DHP: 3,5-bis(ethoxycarbonyl)-2,6-dimethyl-1,4-dihydropyridine | 0.05 | | 0.05 |
| Theic | 0.15 | 0.15 | 0.15 |
| Zinc chloride | 0.15 | 0.15 | 0.15 |
| dE at minute | | | |
| 1 | 16.3 | 16.6 | 14.6 |
| 2 | 16.9 | 18.1 | 15.1 |
| 3 | 19.6 | 22.4 | 18.0 |
| 4 | 29.5 | 29.3 | 26.3 |
| 5 | 64.5 | 49.1 | 65.3 |

As shown in Table 4, the four part combination of zinc chloride, 2-5-tetrahydropyranal-2-ethylhexylthioglycolate, 3,5-bis(ethoxycarbonyl)-2,6-dimethyl-1,4-dihydropyridine, and stearoylbenzoylmethane showed improved stabilization compared to the latent mercaptan with either the DHP or beta-diketone alone. The stabilization effects observed are similar when zinc chloride or zinc octoate are employed.

The above data show that when combined with a latent mercaptan and a zinc compound, a synergistic combination of a dihydropyridine and a beta-diketone shows improved early color retention than either compound by itself.

What is claimed is:

1. A stabilizer composition comprising
a zinc compound,
a latent mercaptan, wherein the latent mercaptan is of formula (1):

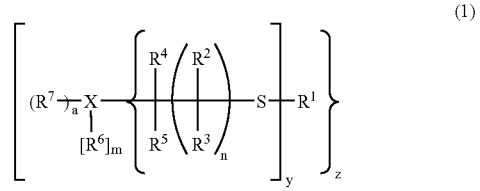

wherein a=0 or 1, m=0 or 1, n=0 or 1, and y=1-4 with the proviso that when y=1, z=1-4 and when y is greater than 1, z=1; $R^1$ is a monovalent, divalent, trivalent, or tetravalent $C_{1-400}$ alkyl, alkenyl, cycloalkyl, cycloalkenyl, aryl, alkaryl, aralkyl, alkenylaryl, aralkenyl, hydroxyalkyl, dihydroxyalkyl, hydroxy(polyalkoxy)alkyl, alkoxyalkyl, hydroxyalkoxyalkyl, alkoxy(hydroxyalkyl), alkoxy(acyloxyalkyl), alkoxy(polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy(polyalkoxy)alkyl, benzoyloxy (polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy)carbonylalkyl, mercaptoalkyl, mercaptoalkenyl, mercaptoalkoxycarbonylalkyl, mercaptoalkoxycarbonylalkenyl, alkoxycarbonyl(amido)alkyl, alkylcarbonyloxy(polyalkoxy) carbonylalkyl, tetrahydopyranyloxy(polyalkoxy) carbonylalkyl, tetrahydropyranyloxyalkyl, hydroxyaryl, mercaptoaryl or carboxyaryl group; $R^2$, $R^3$, $R^4$, $R^5$, $R^6$, and $R^7$ are each independently a —H, —OH, —SH, acyl, $C_{1-52}$ alkyl, alkenyl, aryl, haloaryl, alkaryl, aralkyl, hydroxyalkyl, mercaptoalkyl, hydroxyaryl, alkoxyaryl, alkoxyhydroxyaryl, or mercaptoaryl group; X is aryl, haloaryl, alkaryl, aralkaryl, hydroxyaryl, dihydroxyaryl, cycloalkyl aryl, arylcycloalkyl, or a heteroatom, $R^6$ and $R^7$ may form a heterocyclic moiety in conjunction with X as nitrogen when a is 1 and m is 1, one of $R^1$, $R^3$, and $R^5$ may join with $R^7$ and X to form a heterocyclic moiety with X as a heteroatom selected from the group consisting of oxygen and sulfur when a=1 and m=0; with the proviso that when X is aralkaryl, z is 1 or 2, $R^6$ and $R^7$ are —OH, a=1, and m=1, and with the further proviso that when $R^6$ is —OH or —SH, z=1;

a dihydropyridine, a polydihydropyridine, or a mixture thereof, wherein the dihydropyridine is of formula (2):

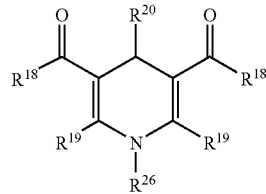

wherein each $R^{19}$ is independently a $C_1$ to $C_{36}$ alkyl group, each $R^{18}$ is independently hydrogen, —$OR^{21}$, —$NHR^{21}$, or —$NR^{21}R^{22}$ wherein each $R^{21}$ and $R^{22}$ are independently a substituted or unsubstituted $C_1$-$C_{20}$ alkyl or $C_2$-$C_{20}$ alkenyl group, each $R^{20}$ is independently hydrogen, oxygen, halogen, or a substituted or unsubstituted $C_1$ to $C_{36}$ alkyl, alkenyl, aryl, alkaryl, or aralkyl group, and $R^{26}$ is a hydrogen, a substituted or unsubstituted $C_1$-$C_{20}$ alkyl, $C_6$-$C_{36}$ aryl, or $C_6$-$C_{36}$ alkaryl group, and wherein the polydihydropyridine is of formula (3):

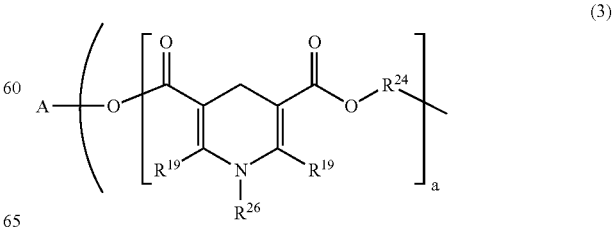

-continued

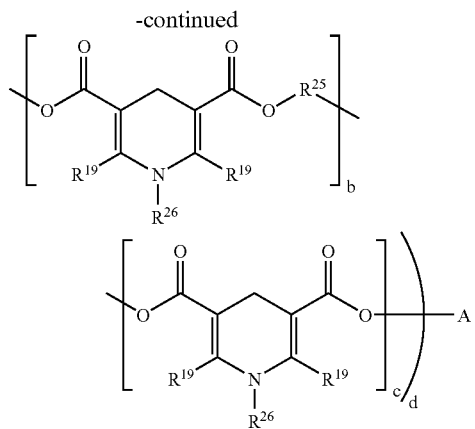

wherein A is a $C_{6-18}$ aryl or $C_{1-22}$ alkyl group that is unsubstituted or substituted with a $C_1$-$C_{18}$ alkoxy, $C_1$-$C_{18}$ alkylthio, hydroxy, acryloyloxy, methacryloyloxy, halogen, phenyl or naphthyl group, $R^{19}$ is independently a $C_1$ to $C_{36}$ alkyl group, a and b are a number from 0 to 20, c is 0 or 1, and d is a number from 1 to 6, with the proviso that d(a+b+c)>1 and (a+b)>0, $R^{24}$ and $R^{25}$ are each independently methylene, phenyl, or an alkylene group of the type (—$C_pH_{2p}$-Q-)$_tC_pH_{2p}$—, wherein p is a number from 2 to 18, t is a number from 0 to 10, and Q is oxygen or sulfur, and $R^{26}$ is a hydrogen, a substituted or unsubstituted $C_1$-$C_{20}$ alkyl, $C_6$-$C_{36}$ aryl or $C_6$-$C_{36}$ alkaryl group; and a beta-diketone wherein the beta-diketone is of formula (4):

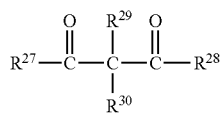

wherein $R^{27}$ is an alkyl group having greater than or equal to 10 carbon atoms, $R^{28}$ is phenyl group or phenyl group substituted with up to 3 lower alkyl groups, and $R^{29}$ and $R^{30}$ are each independently hydrogen, $C_1$-$C_{18}$ alkyl groups, or $C_1$-$C_{18}$ alkyl groups substituted with halogen, hydroxy, alkoxy, ester alkyl or alkoxy carbonyl.

2. The stabilizer composition of claim 1, wherein the beta-diketone is lauroylbenzoylmethane, myristoylbenzoylmethane, palmitoylbenzoylmethane, stearoylbenzoylmethane, octadecanoylbenzoylmethane, tetradecanoylbenzoylmethane, lauroyltoluylmethane, stearoyltoluylmethane, lauroylxyloylmethane, stearoylxyloylmethane, or a combination comprising one or more of the foregoing beta-diketones.

3. The stabilizer composition of claim 1, wherein the latent mercaptan is a 2-S-(tetrahydropyranyl)thioglycolic acid ester of a $C_{4-16}$ alkyl alcohol or a 2-S-(dihydrofuranyl)thioglycolic acid ester of a $C_{4-16}$ alkyl alcohol.

4. The stabilizer composition of claim 1, wherein the dihydropyridine is 3,5-bis(ethoxycarbonyl)-2,6-dimethyl-1,4-dihydro pyridine, the beta-diketone is stearoylbenzoylmethane, and the latent mercaptan is 2-5-tetrahydropyranal-2-ethylhexylthioglycolate.

5. The stabilizer composition of claim 1, wherein the zinc compound is zinc chloride, zinc octoate, or a combination comprising one or more of the foregoing zinc compounds.

6. The stabilizer composition of claim 1, wherein the beta-diketone is stearoylbenzoylmethane.

7. A method of stabilizing a composition comprising adding to a halogen-containing vinyl polymer composition the stabilizer composition of claim 1.

8. A polymeric composition, comprising
a halogen-containing vinyl polymer,
a zinc compound,
a latent mercaptan, wherein the latent mercaptan is of formula (1):

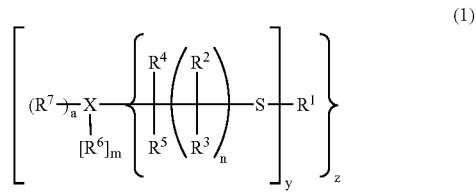

wherein a=0 or 1, m=0 or 1, n=0 or 1, and y=1-4 with the proviso that when y=1, z=1-4 and when y is greater than 1, z=1; $R^1$ is a monovalent, divalent, trivalent, or tetravalent $C_{1-400}$ alkyl, alkenyl, cycloalkyl, cycloalkenyl, aryl, alkaryl, aralkyl, alkenylaryl, aralkenyl, hydroxyalkyl, dihydroxyalkyl, hydroxy(polyalkoxy)alkyl, alkoxyalkyl, hydroxyalkoxyalkyl, alkoxy(hydroxyalkyl), alkoxy(acyloxyalkyl), alkoxy(polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy(polyalkoxy)alkyl, benzoyloxy (polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy)carbonylalkyl, mercaptoalkyl, mercaptoalkenyl, mercaptoalkoxycarbonylalkyl, mercaptoalkoxycarbonylalkenyl, alkoxycarbonyl(amido)alkyl, alkylcarbonyloxy(polyalkoxy) carbonylalkyl, tetrahydopyranyloxy(polyalkoxy) carbonylalkyl, tetrahydropyranyloxyalkyl, hydroxyaryl, mercaptoaryl or carboxyaryl group; $R^2$, $R^3$, $R^4$, $R^5$, $R^6$, and $R^7$ are each independently a —H, —OH, —SH, acyl, $C_{1-52}$ alkyl, alkenyl, aryl, haloaryl, alkaryl, aralkyl, hydroxyalkyl, mercaptoalkyl, hydroxyaryl, alkoxyaryl, alkoxyhydroxyaryl, or mercaptoaryl group; X is aryl, haloaryl, alkaryl, aralkaryl, hydroxyaryl, dihydroxyaryl, cycloalkyl aryl, arylcycloalkyl, or a heteroatom, $R^6$ and $R^7$ may form a heterocyclic moiety in conjunction with X as nitrogen when a is 1 and m is 1, one of $R^1$, $R^3$, and $R^5$ may join with $R^7$ and X to form a heterocyclic moiety with X as a heteroatom selected from the group consisting of oxygen and sulfur when a=1 and m=0; with the proviso that when X is aralkaryl, z is 1 or 2, $R^6$ and $R^7$ are —OH, a=1, and m=1, and with the further proviso that when $R^6$ is —OH or —SH, z=1;

a dihydropyridine, a polydihydropyridine, or a mixture thereof, wherein the dihydropyridine is of formula (2)

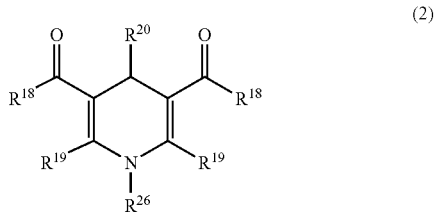

wherein each $R^{19}$ is independently a $C_1$ to $C_{36}$ alkyl group, each $R^{18}$ is independently hydrogen, —$OR^{21}$, —$NHR^{21}$, or —$NR^{21}R^{22}$ wherein each $R^{21}$ and $R^{22}$ are independently a substituted or unsubstituted $C_1$-$C_{20}$ alkyl or $C_2$-$C_{20}$ alkenyl group, each $R^{20}$ is independently hydrogen, oxygen, halogen, or a substituted or unsubstituted $C_1$ to $C_{36}$ alkyl, alkenyl, aryl, alkaryl, or aralkyl group, and $R^{26}$ is a hydrogen, a substituted or unsubstituted $C_1$-$C_{20}$ alkyl, $C_6$-$C_{36}$ aryl, or $C_6$-$C_{36}$ alkaryl group, and wherein the polydihydropyridine is of formula (3):

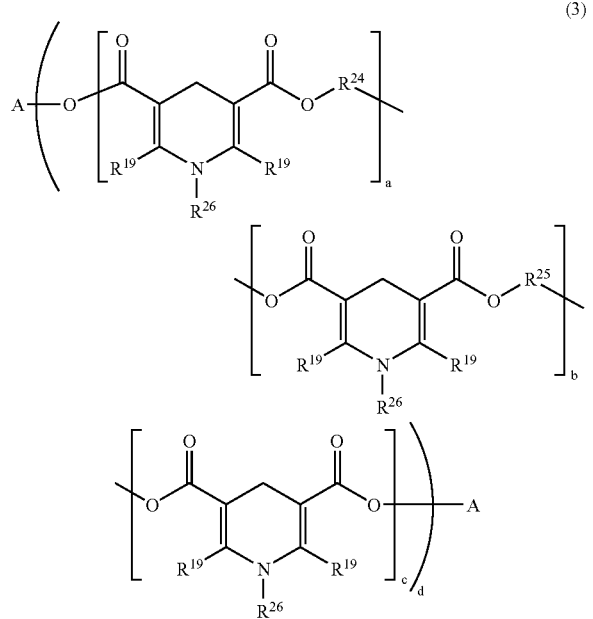

(3)

wherein A is a $C_{6-18}$ aryl or $C_{1-22}$ alkyl group that is unsubstituted or substituted with a $C_1$-$C_{18}$ alkoxy, $C_1$-$C_{18}$ alkylthio, hydroxy, acryloyloxy, methacryloyloxy, halogen, phenyl or naphthyl group, $R^{19}$ is independently a $C_1$ to $C_{36}$ alkyl group, a and b are a number from 0 to 20, c is 0 or 1, and d is a number from 1 to 6, with the proviso that d(a+b+c)>1 and (a+b)>0, $R^{24}$ and $R^{25}$ are each independently methylene, phenyl, or an alkylene group of the type (—$C_pH_{2p}$-Q-)$_tC_pH_{2p}$—, wherein p is a number from 2 to 18, t is a number from 0 to 10, and Q is oxygen or sulfur, and $R^{26}$ is a hydrogen, a substituted or unsubstituted $C_1$-$C_{20}$ alkyl, $C_6$-$C_{36}$ aryl or $C_6$-$C_{36}$ alkaryl group; and a beta-diketone wherein the beta-diketone is of formula (4)

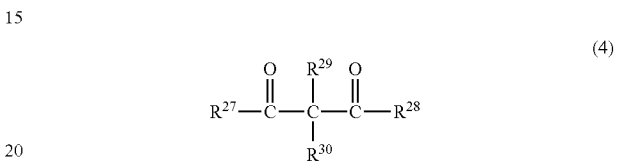

(4)

wherein $R^{27}$ is an alkyl group having greater than or equal to 10 carbon atoms, $R^{28}$ is phenyl group or phenyl group substituted with up to 3 lower alkyl groups, and $R^{29}$ and $R^{30}$ are each independently hydrogen, $C_1$-$C_{18}$ alkyl groups, or $C_1$-$C_{18}$ alkyl groups substituted with halogen, hydroxy, alkoxy, ester alkyl or alkoxy carbonyl.

9. The stabilized polymer composition of claim 8, comprising 0.001 to 10 phr of the zinc compound, 0.05 to 2.0 phr of the latent mercaptan, 0.05 to 1.0 phr of the dihydropyridine, and 0.05 to 1.0 phr of the beta-diketone.

10. An article comprising the stabilized polymer composition of claim 8.

* * * * *